United States Patent
Lin et al.

(10) Patent No.: US 7,466,305 B2
(45) Date of Patent: Dec. 16, 2008

(54) METHOD AND RELATED APPARATUS FOR DECREASING DELAY TIME AND POWER CONSUMPTION OF A WIRELESS MOUSE

(75) Inventors: Bi-Hui Lin, Hsin-Chu Hsien (TW); Chin-Hsin Yang, Hsin-Chu Hsien (TW); Chin-Chou Lee, Hsin-Chu Hsien (TW); Chun-Huang Lin, Hsin-Chu Hsien (TW); Wen-Yu Yang, Hsin-Chu Hsien (TW)

(73) Assignee: PixArt Imaging Inc., Hsin-Chu Hsien (TW)

( * ) Notice: Subject to any disclaimer, the term of this patent is extended or adjusted under 35 U.S.C. 154(b) by 480 days.

(21) Appl. No.: 10/908,076

(22) Filed: Apr. 27, 2005

(65) Prior Publication Data

US 2006/0146022 A1    Jul. 6, 2006

(30) Foreign Application Priority Data

Dec. 31, 2004    (TW) .............................. 93141788 A (51) Int. Cl.
*G09G 5/08* (2006.01)

(52) U.S. Cl. ....................... 345/163; 165/166; 165/167; 165/168

(58) Field of Classification Search .................. 345/163, 345/165–168
See application file for complete search history.

(56) References Cited

U.S. PATENT DOCUMENTS

| | | | | |
|---|---|---|---|---|
| 6,995,750 | B2 * | 2/2006 | Albulet et al. | 345/170 |
| 7,292,225 | B2 * | 11/2007 | Gordon et al. | 345/163 |
| 2006/0035590 | A1 * | 2/2006 | Morris et al. | 455/41.2 |

* cited by examiner

*Primary Examiner*—Richard Hjerpe
*Assistant Examiner*—Leonid Shapiro
(74) *Attorney, Agent, or Firm*—Winston Hsu (57) ABSTRACT

The present invention provides a method for increasing a report rate of a wireless mouse for decreasing delay time of the wireless mouse, which includes: selecting a packet mode from a plurality of packet modes and inputting data corresponding to the selected packet mode for forming a packet according to control signals inputted into the wireless mouse; and outputting the packet through a radio-frequency channel. The present invention further provides a method for reducing power consumption of a mouse, which includes: detecting a moving speed of the mouse; and transmitting packets with a low report rate when the moving speed of the mouse is less than a default value.

10 Claims, 11 Drawing Sheets

| Packet mode | Block 604 | Block 606 | Block 608 | Block 610 |
|---|---|---|---|---|
| 1st | 0 | 0 | RF ID | RF ID |
| 2nd | 0 | 1 | X-axis displacement | Y-axis displacement |
| 3rd | 1 | 0 | Scroll displacement | Switch status |
| 4th | 1 | 1 | Extended function | Extended function |

| Packet mode | Block 604 | Block 606 | Block 608 | Block 610 |
|---|---|---|---|---|
| 1st | 0 | 0 | RF ID | RF ID |
| 2nd | 0 | 1 | X-axis displacement | Y-axis displacement |
| 3rd | 1 | 0 | Scroll displacement | Switch status |
| 4th | 1 | 1 | Extended function | Extended function |

METHOD AND RELATED APPARATUS FOR DECREASING DELAY TIME AND POWER CONSUMPTION OF A WIRELESS MOUSE

BACKGROUND OF INVENTION

1. Field of the Invention

The present invention provides methods and a related apparatus for decreasing delay time and power consumption of a wireless mouse, and more particularly, methods for decreasing delay time and power consumption by changing a report rate of the wireless mouse.

2. Description of the Prior Art

From traditional functions, such as document processing and program operating, to modern multimedia, game playing, etc., a personal computer has become an important role in our daily life. Mouses and keyboards used for controlling the PC have improved too. As graphical user interfaces become the main stream interface, precision of a mouse becomes more and more important. In addition, with wireless communication technology, a traditional mouse, which transmits signals to a computer system with physical wires, can be replaced by a wireless mouse. However, owing to limitations of wireless communication, a report rate of the prior art wireless mouse cannot match the same level as the wired mouse. The word "report" of the report rate means that the wireless mouse transmits detected displacement and switch statuses to the computer system, while report per second, or RPS, is a term used to count the report rate, meaning how many signal counts are transmitted to the computer each second. The larger the RPS is, the more moving consistency there will be between a cursor in the monitor and the mouse in a user's hand. In general, the report rate of a wired USB mouse is between 100 Hz and 125 Hz, or between 100 and 125 report counts per second, while the report rate of the wireless mouse is between 60 Hz and 80 Hz. Therefore, the user can feel an obvious difference between the wired mouse and the wireless mouse, especially for fast moving operations, such as PC games, drafting, and web surfing.

Figure 1:
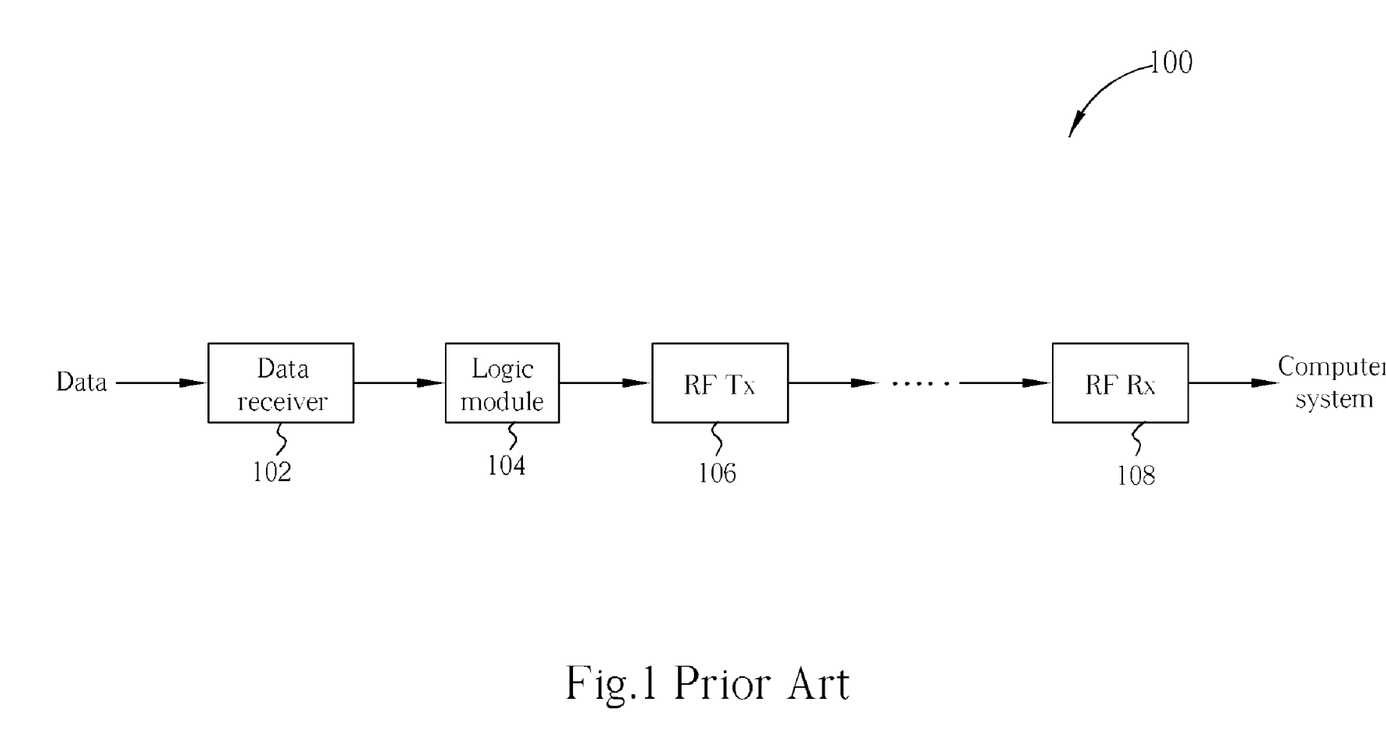
FIG. 1 illustrates a block diagram of a prior art wireless mouse.

Please refer to FIG. 1, which illustrates a block diagram of a prior art wireless mouse 100. The wireless mouse 100 includes a data receiver 102, a logic module 104, a radio-frequency transmitter 106, and a radio-frequency receiver 108. The data receiver 102 receives data pertaining to displacement and the switch status of the wireless mouse 100 and transmits the data to the logic module 104. The logic module 104 transforms data received by the data receiver 102 to packets and transmits the packets to the radio-frequency transmitter 106. The radio-frequency transmitter 106 transmits the packets through the radio-frequency receiver 108 to a computer system sequentially, so as to show effects of the displacement data and the switch status data on a monitor of the computer system.

Figure 2:
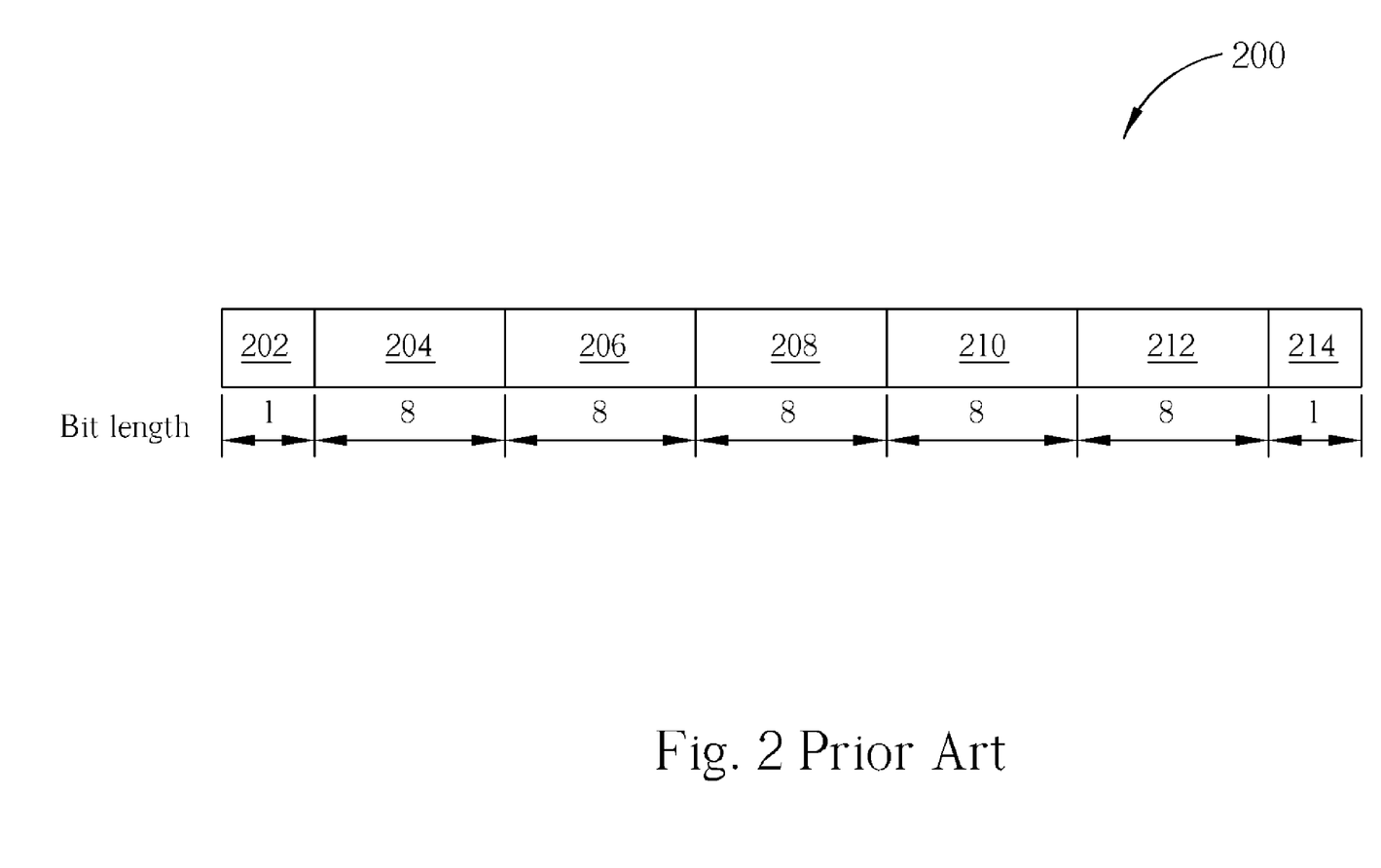
FIG. 2 illustrates a schematic diagram of a packet outputted from a radio-frequency transmitter of a prior art wireless mouse.

Please refer to FIG. 2, which illustrates a schematic diagram of a packet 200 outputted from a radio-frequency transmitter of a prior art wireless mouse. The packet 200 includes blocks 202, 204, 206, 208, 210, 212, and 214 with bit lengths of 1, 8, 8, 8, 8, 8, and 1 bit. So, the total bit length of the packet 200 is 42 bits. The blocks 202 and 214 indicate a start and a stop of the packet 200. The blocks 204, 206, 208, and 210 store an x-axis displacement data, a y-axis displacement data, a scroll-wheel displacement data, and a switch status data of the wireless mouse. In addition, the block 212 is an 8-bit cyclic redundancy check, or CRC, block.

Figure 3:
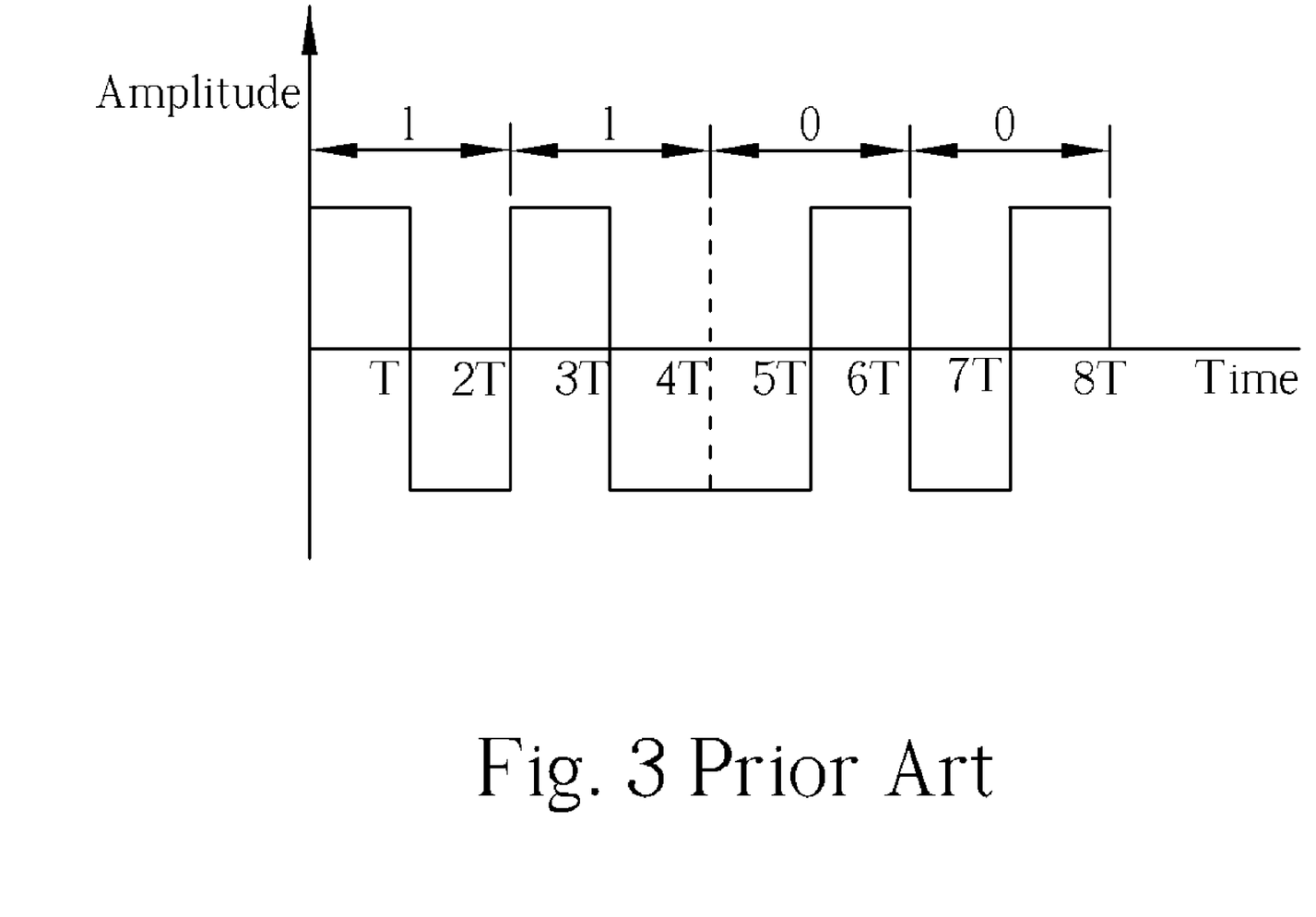
FIG. 3 illustrates a schematic waveform diagram of a prior art Manchester code.

In general, the prior art wireless mouse transmits signals with a technique of binary frequency shift keying, or BFSK, meaning that bits (or symbols) 1 and 0 are transmitted with two sinusoidal waves having different frequencies. Take a prior art wireless mouse with an intermediate frequency at 27 MHz for example, in which a bit 0 is represented by a 27.1 MHz sinusoidal wave, and a bit 1 is represented by a 26.9 MHz sinusoidal wave. In addition, a split-phase coding, such as a Manchester coding, has zero power at a direct-current level, and includes a zero crossing within a bit interval, which can increase correctness. Therefore, the prior art wireless mouse usually applies the Manchester coding. Please refer to FIG. 3, which illustrates a schematic waveform diagram of a prior art Manchester code. As shown in FIG. 3, transmitting one bit needs 2T duration. Therefore, if 1T duration of transmitting time is 160 µs, transmitting a packet of the bit needs 13.44 ms (42 bit×2×160 µs=13.44 ms) with the prior art wireless mouse. In the same case, the wired mouse uses 8 ms, which is the main reason that the report rate of the wireless mouse is less than that of the wired mouse.

Figure 4:
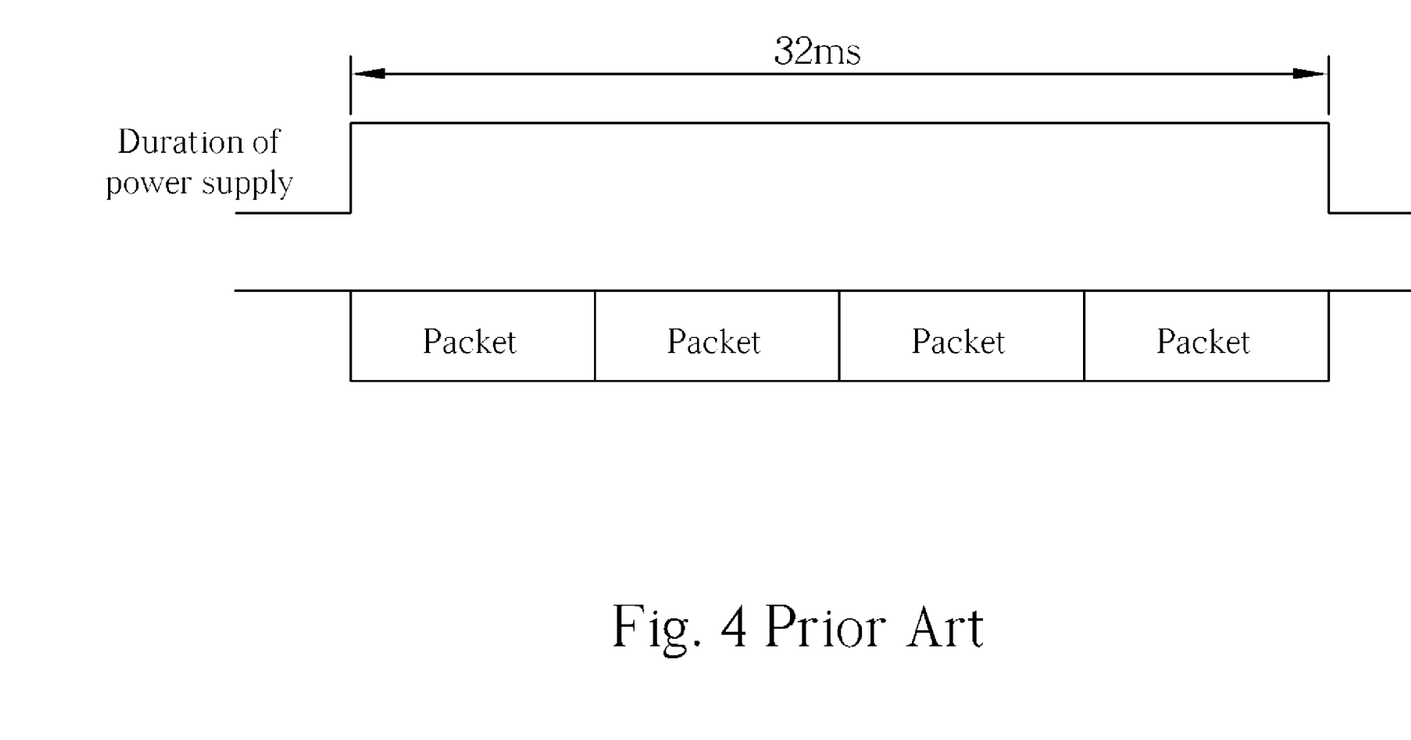
FIG. 4 illustrates a schematic diagram of a prior art mouse when transmitting four packets.

Moreover, unlike the wired mouse powered by the computer system through the physical wires, the transmitter of the wireless mouse must include an independent power supply device. Since the report rate of the prior art mouse is fixed, the mouse consumes the same amount of power in transmitting packets no matter how fast the mouse moves. Such power management is inefficient. For example, please refer to FIG. 4, which illustrates a schematic diagram of a prior art mouse when transmitting four packets. Each packet needs 8 ms, so the total time of using power for transmitting the four packets is 32 ms.

In short, the wireless mouse is convenient, but is limited by the low report rate and the inefficient power management.

SUMMARY OF INVENTION

It is therefore a primary objective of the claimed invention to provide methods and a related apparatus for decreasing delay time and power consumption of a wireless mouse.

The present invention discloses a method for increasing a report rate of a wireless mouse for decreasing delay time of the wireless mouse. The method includes: selecting a packet mode from a plurality of packet modes and inputting data corresponding to the selected packet mode for forming a packet according to control signals inputted into the wireless mouse; and outputting the packet through a radio-frequency channel.

The present invention discloses a chip of a wireless mouse for increasing a report rate of the wireless mouse. The chip includes: a reception module for receiving control signals of the wireless mouse; a logic module coupled to the reception module for selecting a packet mode from a plurality of packet modes and inputting data corresponding to the selected packet mode for forming a packet according to control signals inputted into the wireless mouse; and an output module coupled to the logic module for outputting the packet formed by the logic module to a radio-frequency transmitter of the wireless mouse for transmitting the packet to a computer system corresponding to the wireless mouse through a radio-frequency channel.

The present invention discloses a wireless mouse capable of increasing a report rate. The wireless mouse includes: a housing; a sense circuit deposited within the housing for receiving an x-axis displacement data, a y-axis displacement data, a scroll-wheel displacement data, and a switch status data of the wireless mouse; a chip coupled to the sense circuit, a radio-frequency transmitter coupled to the output module of the chip for outputting the packet through a radio-frequency channel; and a radio-frequency receiver coupled to a computer system for receiving the packet from the radio-frequency transmitter and transmitting the packet to the computer system. The chip coupled to the sense circuit includes: a reception module for receiving control signals of the wireless mouse; a logic module coupled to the reception module for selecting a packet mode from a plurality of packet modes and inputting data corresponding to the selected packet mode for forming a packet according to the control signals; and an output module coupled to the logic module for outputting the packet formed by the logic module.

The present invention discloses a method for reducing power consumption of a mouse. The method includes: detecting a moving speed of the mouse; and transmitting packets with a low report rate when the moving speed of the mouse is less than a default value.

The present invention discloses a chip of a mouse for reducing power consumption of the mouse. The chip includes: a velocity decision module for detecting a moving speed of the mouse; and a report-rate adjustment module coupled to the velocity decision module for transmitting packets with a low report rate when the moving speed of the mouse is less than a default value.

The present invention discloses a mouse capable of reducing power consumption. The mouse includes: a housing; a sense circuit deposited within the housing for sensing related data of the mouse; a control circuit coupled to the sense circuit for forming a plurality of packets according to the related data of the mouse; a chip; and a transmitter coupled to the chip for transmitting the packets of the mouse to a computer system. The chip includes: a velocity decision module for detecting a moving speed of the mouse; and a report-rate adjustment module coupled to the velocity decision module for transmitting the packets formed by the control circuit with a low report rate when the moving speed of the mouse is less than a default value These and other objectives of the present invention will no doubt become obvious to those of ordinary skill in the art after reading the following detailed description of the preferred embodiment that is illustrated in the various figures and drawings.

DETAILED DESCRIPTION

Figure 5:
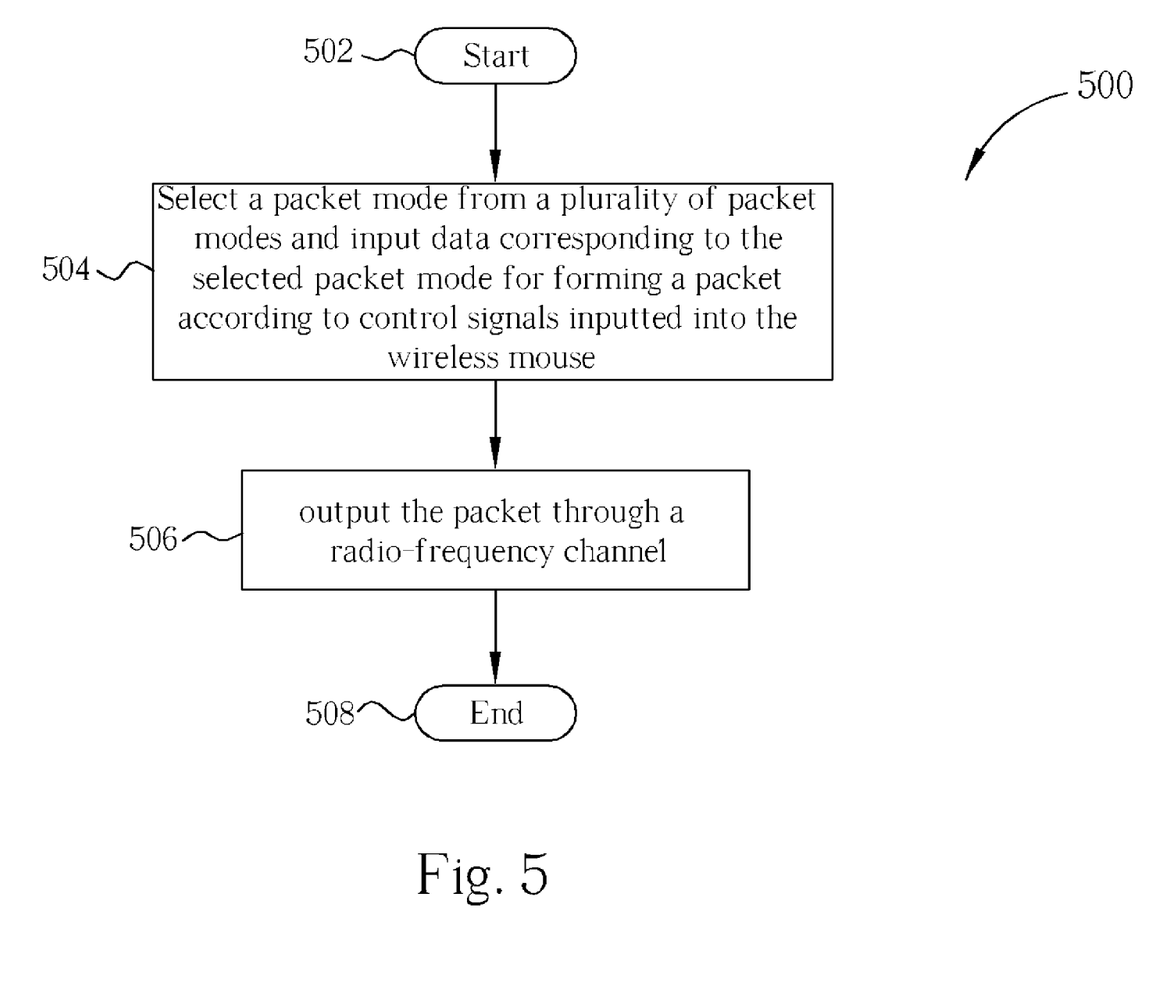
FIG. 5 illustrates a flowchart of a process for increasing a report rate of a wireless mouse in accordance with the present invention.

Please refer to FIG. 5, which illustrates a flowchart of a process 500 for increasing a report rate of a wireless mouse in accordance with the present invention. The process 500 includes following steps:

Step 502: start;

Step 504: select a packet mode from a plurality of packet modes and input data corresponding to the selected packet mode for forming a packet according to control signals inputted into the wireless mouse;

Step 506: output the packet through a radio-frequency channel;

Step 508: end.

Figure 6:
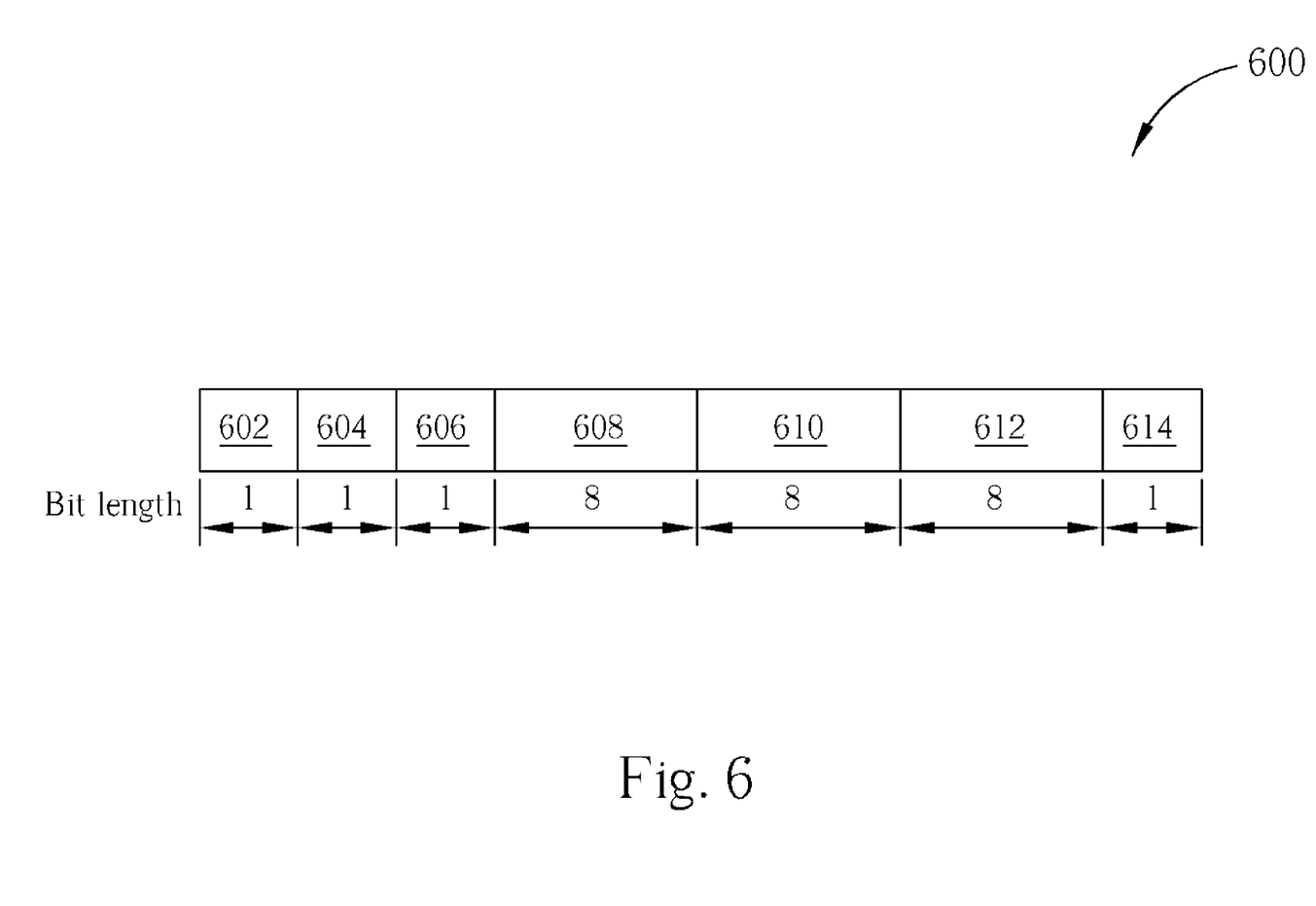
FIG. 6 illustrates a schematic diagram of an embodiment packet of a wireless mouse
Figure 7:
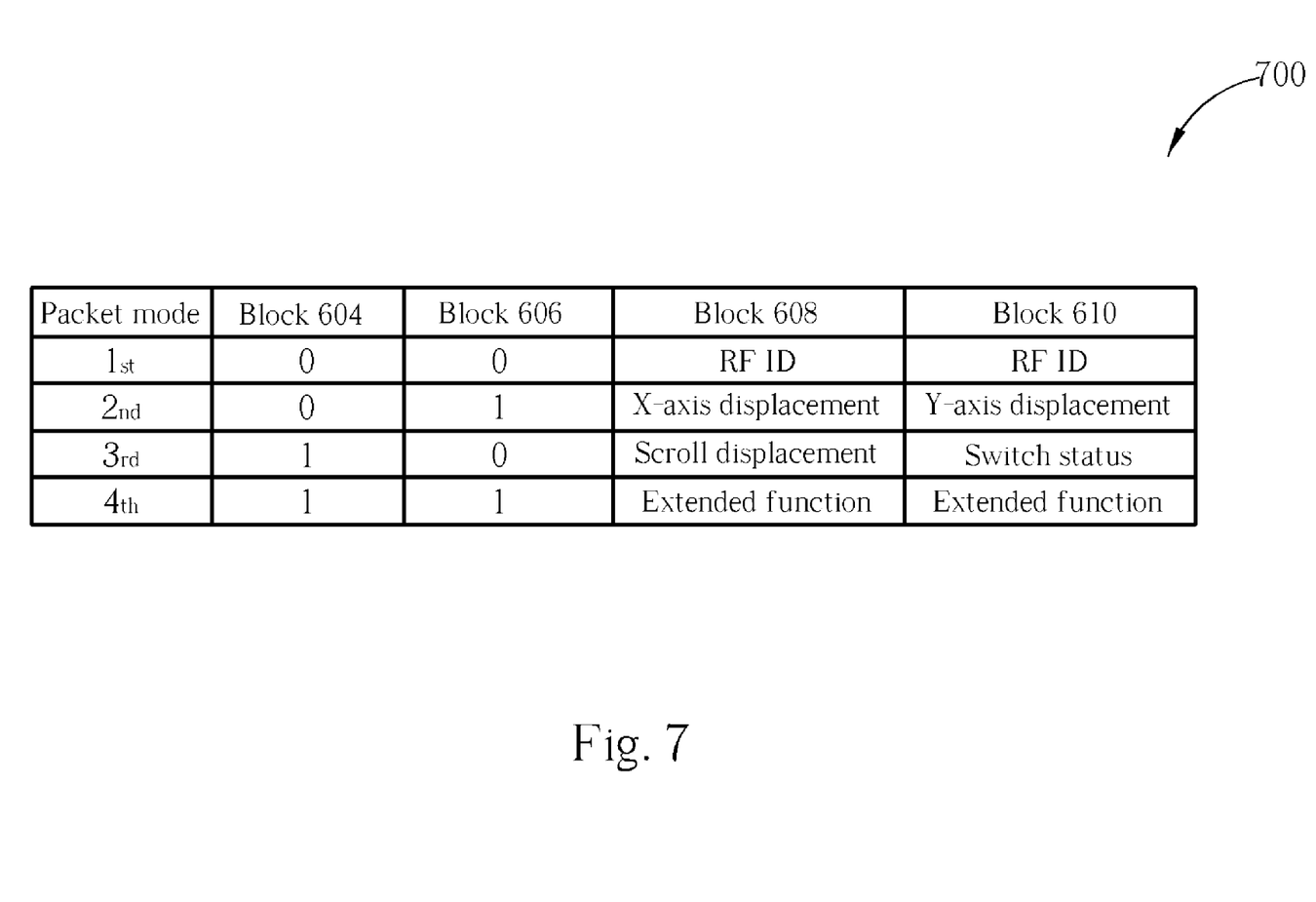
FIG. 7 illustrates a table of packet modes corresponding to a packet in FIG. 6.

Therefore, the present invention determines a packet mode according to the control signals. For example, please refer to FIG. 6 and FIG. 7. FIG. 6 illustrates a schematic diagram of an embodiment packet 600 of a wireless mouse, while FIG. 7 illustrates a table 700 of packet modes corresponding to the packet 600. In FIG. 6, the packet 600 includes blocks 602, 604, 606, 608, 610, 612, and 614 with bit lengths of 1, 1, 1, 8, 8, 8, and 1 bit, so the total bit length of the packet 600 is 28 bits. The blocks 602 and 614 indicate a start and a stop of the packet 600. The blocks 604 and 606 store binary signals for indicating a packet mode, so in this case, there are four packet modes. The blocks 608 and 610 store data corresponding to the packet mode. The block 612 is an 8-bit cyclic redundancy check, or CRC, block. For example, in FIG. 7, if the blocks 604 and 606 are 0, the blocks 608 and 610 store a radio-frequency identification data of the wireless mouse. If the block 604 is 0 and the block 606 is 1, the blocks 608 and 610 store an x-axis displacement data and a y-axis displacement data of the wireless mouse. If the block 604 is 1 and the block 606 is 0, the blocks 608 and 610 store a scroll-wheel displacement data and a switch status data of the wireless mouse. Finally, if the blocks 604 and 606 are 1, the blocks 608 and 610 store extended functions of the wireless mouse. Therefore, with the bits stored in the blocks 604 and 606, the packet 600 can be in one of four packet modes.

As shown in FIG. 6, bit length of the packet 600 is 28 bits, so if the wireless mouse transmits the packet 600 with the Manchester coding, each packet requires 8.96 ms (28 bits× 2×160 μs=8.96 ms), which is 33% faster than the prior art.

Figure 8:
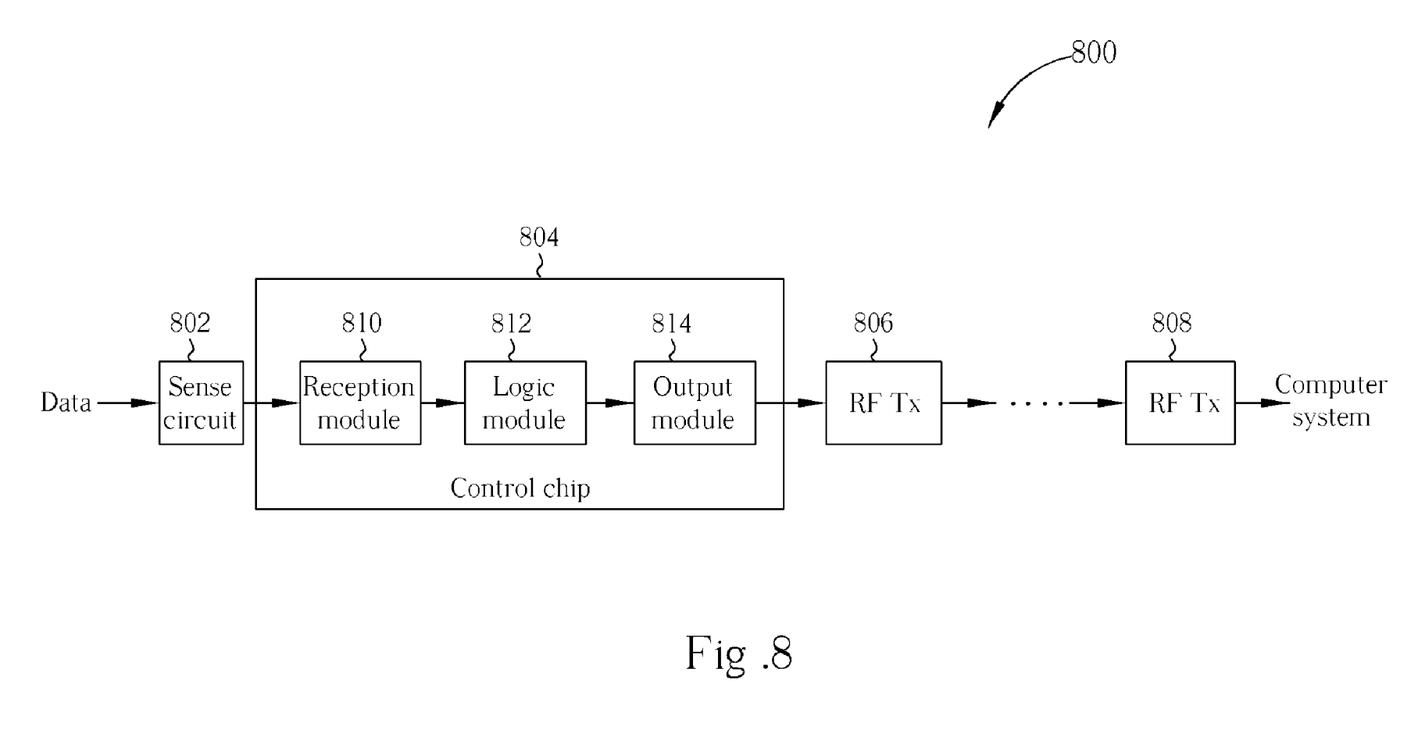
FIG. 8 illustrates a block diagram of an embodiment wireless mouse in accordance with the present invention.

Please refer to FIG. 8, which illustrates a block diagram of an embodiment wireless mouse 800 in accordance with the present invention. The wireless mouse can increase the report rate, which includes a sense circuit 802, a control chip 804, a radio-frequency transmitter 806, and a radio-frequency receiver 808. The control chip 804 includes a reception module 810, a logic module 812, and an output module 814. The sense circuit 802 receives an x-axis displacement data, a y-axis displacement data, a scroll-wheel displacement data, and a switch status data of the wireless mouse 800, and outputs to the reception module 810 of the control chip 804. According to different control signals, the logic module 812 of the control chip 804 selects a packet mode from a plurality of packet modes, and inputs data corresponding to the selected packet mode for forming a packet. Then, the output module 814 outputs the packet formed by the logic module 812 to the radio-frequency transmitter 806, so as to transmit the packet through a radio channel. The radio-frequency receiver 808 receives the packet outputted from the radio-frequency transmitter 806, provides the packet to a computer system, and the computer system displays effects of displacement and switch status on a monitor. Therefore, the wireless mouse 800 transmits different packets according to different packet modes. The wireless mouse 800 can increase the report rate. For example, if the control chip 804 transmits packets according to the table 700 of packet modes, transmission time of each packet is 8.96 ms. Also, if the wireless mouse 800 transmits each bit with 132 μs, the wireless mouse 800 can reach the same report rate as the wired mouse. As a result, a user of the wireless mouse 800 will not sense any difference between the present invention wireless mouse 800 and the wired mouse.

Figure 9:
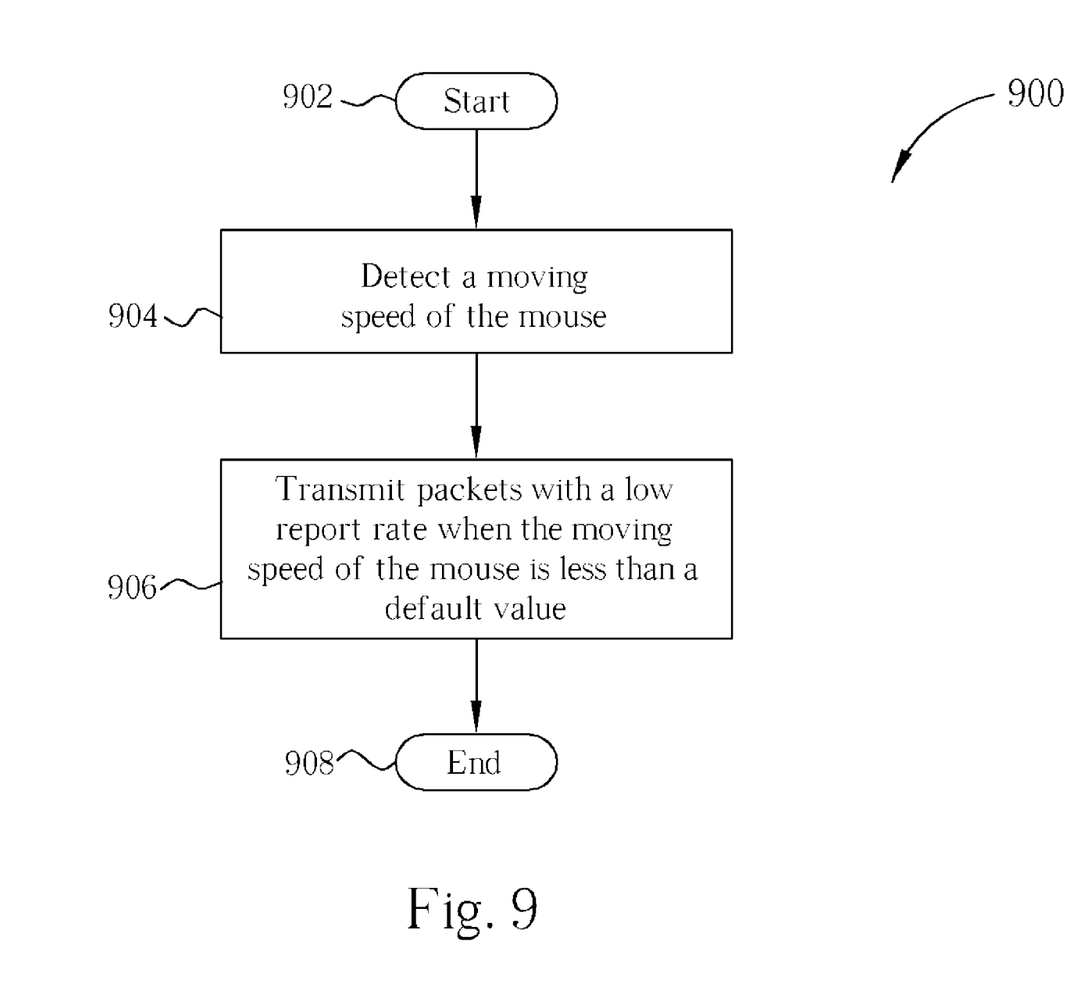
FIG. 9 illustrates a flowchart of a process for reducing power consumption of a mouse in accordance with the present invention.

Furthermore, in order to decrease power consumption of a mouse, please refer to FIG. 9, which illustrates a flowchart of a process 900 for reducing power consumption of a mouse in accordance with the present invention. The process 900 includes following steps:

Step 902: start.

Step 904: detect a moving speed of the mouse.

Step 906: transmit packets with a low report rate when the moving speed of the mouse is less than a default value.

Step 908: end.

Figure 10:
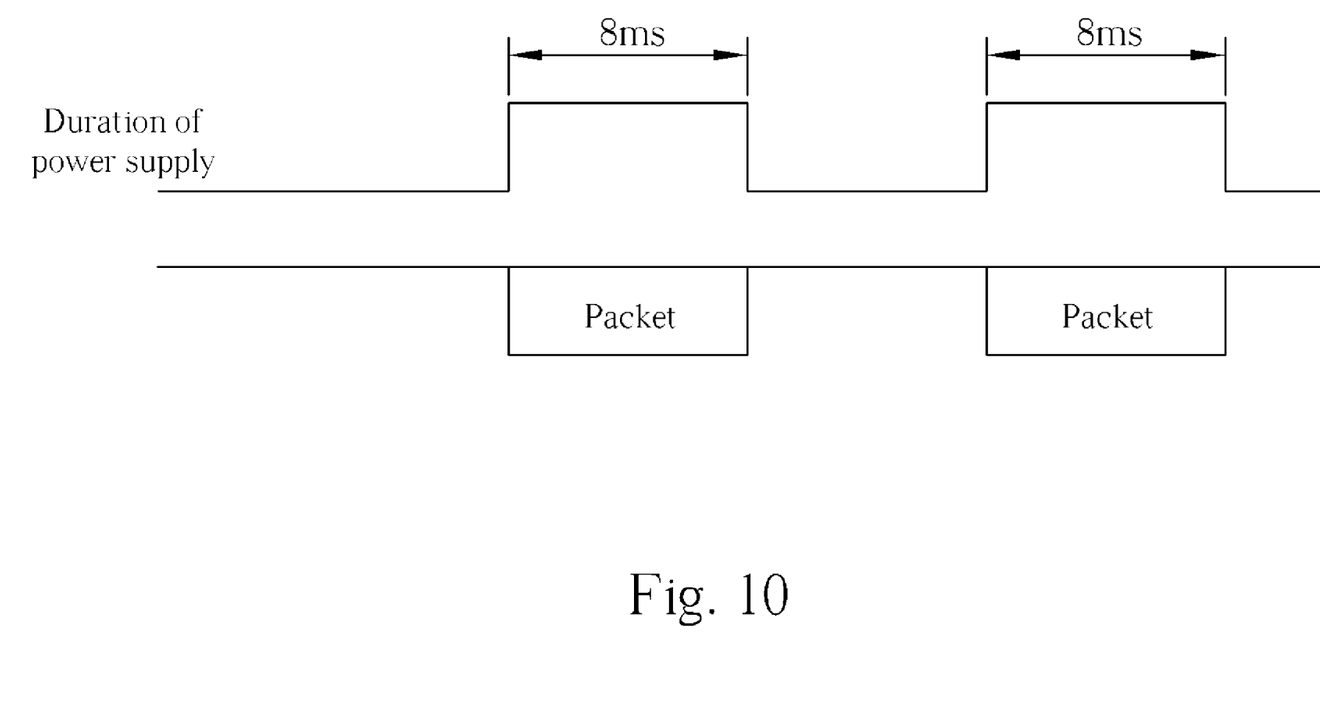
FIG. 10 illustrates a schematic diagram of the present invention mouse when transmitting four packets.

Therefore, according to the process 900, the present invention adjusts a report rate of a mouse dynamically, so as to operate the mouse with lower power when the mouse moves slowly. When a prior art mouse of 400 count per inch, CPI, moves slower than 3 inch/s with the report rate 125 Hz, each report includes about 10 measurements (3 inch/s×400 CPI÷125 Hz=9.6), but the mouse consumes the same amount of power as it does when moving at other speeds. Please refer to FIG. 10. Continuing with the above example, the present invention can decrease the report rate to 62 Hz, meaning that the mouse reports once every 16 ms, so transmitting four packets requires 16 ms power supply, which is half of the prior art (shown in FIG. 4).

Figure 11:
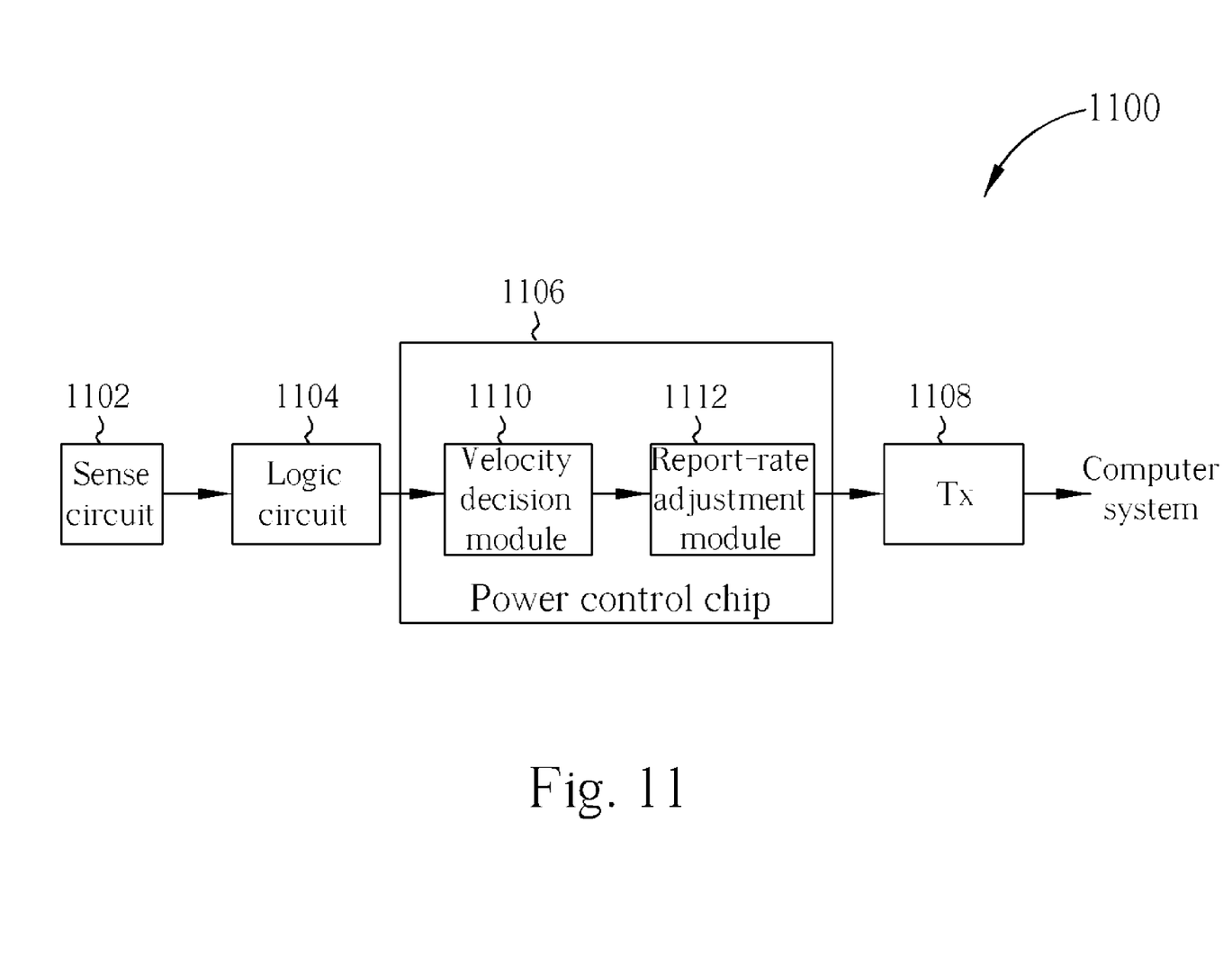
FIG. 11 illustrates a block diagram of a mouse capable of reducing power consumption in accordance with the present invention.

Please refer to FIG. 11, which illustrates a block diagram of a mouse 1100 in accordance with the present invention. The mouse 1100 can decrease power consumption, which includes a sense circuit 1102, a logic circuit 1104, a power control chip 1106, and a transmitter 1108. The power control chip 1106 includes a velocity decision module 1110, and a report-rate adjustment module 1112. The sense circuit 1102 receives an x-axis displacement data, a y-axis displacement data, a scroll-wheel displacement data, and a switch status data of the mouse 1100, and outputs to the logic circuit 1104. The logic circuit 1104 forms a plurality of packets according the received data, and transmits the packets to the power control chip 1106. The velocity decision module 1110 of the power control chip 1106 detects the moving speed of the mouse, while the report-rate adjustment module 1112 adjusts the report rate of the mouse 1100 when the moving speed of the mouse 1100 is less than a default value. Then, the transmitter 1108 transmits the packets according to the report rate adjusted by the report-rate adjustment module 1112. For example, the velocity decision module 1110 detects the moving speed of the mouse 1100 according to the displacement data provided by the sense circuit 1102, and the report-rate adjustment module 1112 stores and increments displacement data, then transmits to the transmitter 1108. Or, the report-rate adjustment module 1112 controls the sense circuit 1102 to read the displacement data with a longer interval when the mouse moves slower than the default, so that the report rate can be decreased.

A wired mouse is powered by a computer system through wires, so power consumption of the wired mouse is not a big problem. However, a wireless mouse must include an independent power supply, so power consumption in the wireless mouse is a critical issue. The present invention 900 can adjust the report rate of the wireless mouse dynamically according to different moving speeds, so that when moving slowly, the mouse consumes less power.

In short, the present invention provides a method for increasing a report rate of a wireless mouse and a method for decreasing power consumption. The packet 600 in FIG. 6 and the table 700 of packet modes in FIG. 700 are merely exemplary embodiments. If the mouse needs more packet modes (the mouse includes more switches for example), the present invention can increase numbers of the logic control signals and corresponding packet modes. In addition, the process 900 in FIG. 9 can be applied for both wired and wireless mouses. Therefore, according to the process 500 and the process 900, the present invention can realize a wireless mouse with a high report rate and low power consumption, so as to increase transmission speed, decrease delay time, and save power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing a report rate of a wireless mouse for decreasing delay time of the wireless mouse comprising:
   (a) selecting a packet mode from a plurality of packet modes and inputting a radio-frequency identification data corresponding to the selected packet mode of the wireless mouse for forming a packet according to control signals inputted into the wireless mouse; and
   (b) outputting the packet through a radio-frequency channel.

2. The method of claim 1, wherein bit length of the packet is 28 bits.

3. A chip of a wireless mouse for increasing a report rate of the wireless mouse comprising:
   a reception module for receiving control signals of the wireless mouse;
   a logic module coupled to the reception module for selecting a packet mode from a plurality of packet modes and inputting a radio-frequency identification data corresponding to the selected packet mode of the wireless mouse for forming a packet according to control signals inputted into the wireless mouse; and
   an output module coupled to the logic module for outputting the packet formed by the logic module to a radio-frequency transmitter of the wireless mouse for transmitting the packet to a computer system corresponding to the wireless mouse through a radio-frequency channel.

4. The chip of claim 3, wherein bit length of the packet is 28 bits.

5. A wireless mouse capable of increasing a report rate comprising:
   a housing;
   a sense circuit deposited within the housing for receiving an x-axis displacement data, a y-axis displacement data, a scroll-wheel displacement data, and a switch status data of the wireless mouse;
   a chip coupled to the sense circuit comprising:
      a reception module for receiving control signals of the wireless mouse;
      a logic module coupled to the reception module for selecting a packet mode from a plurality of packet modes and inputting a radio-frequency identification data, an x-axis displacement data, a y-axis displacement data, a scroll-wheel displacement data, and a switch status data corresponding to the selected packet mode of the wireless mouse for forming a packet according to the control signals; and an output module coupled to the logic module for outputting the packet formed by the logic module;

a radio-frequency transmitter coupled to the output module of the chip for outputting the packet through a radio-frequency channel; and a radio-frequency receiver coupled to a computer system for receiving the packet from the radio-frequency transmitter and transmitting the packet to the computer system.

6. The wireless mouse of claim 5, wherein bit length of the packet is 28 bits.

7. A method for increasing a report rate of a wireless mouse for decreasing delay time of the wireless mouse comprising:

(a) selecting a packet mode from a plurality of packet modes and inputting a scroll-wheel displacement data and a switch status data corresponding to the selected packet mode for forming a packet according to control signals inputted into the wireless mouse; and (b) outputting the packet through a radio-frequency channel.

8. The method of claim 7, wherein bit length of the packet is 28 bits.

9. A chip of a wireless mouse for increasing a report rate of the wireless mouse comprising:

a reception module for receiving control signals of the wireless mouse;

a logic module coupled to the reception module for selecting a packet mode from a plurality of packet modes and inputting a scroll-wheel displacement data and a switch status data corresponding to the selected packet mode for forming a packet according to control signals inputted into the wireless mouse; and an output module coupled to the logic module for outputting the packet formed by the logic module to a radio-frequency transmitter of the wireless mouse for transmitting the packet to a computer system corresponding to the wireless mouse through a radio-frequency channel.

10. The chip of claim 9, wherein bit length of the packet is 28 bits.

* * * * *